Jan. 14, 1964     E. G. EWING     3,117,753
GLIDING PARACHUTE
Filed June 16, 1961     3 Sheets-Sheet 1
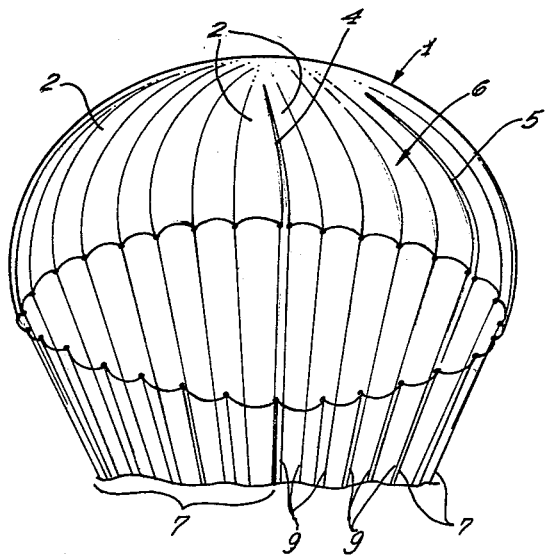
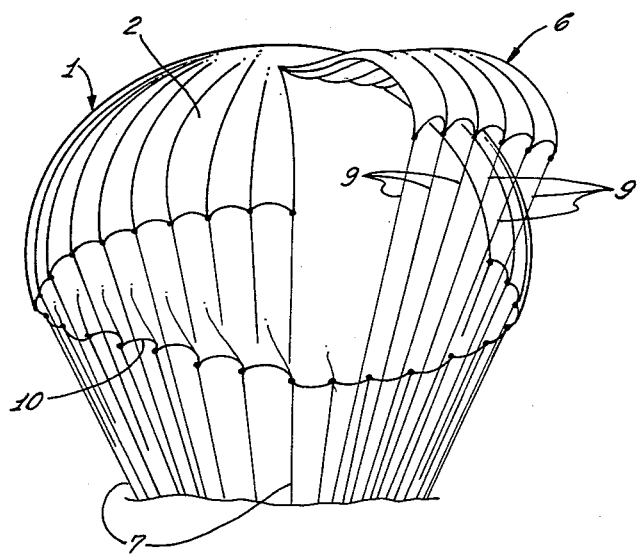
INVENTOR:
Edgar G. Ewing
By Willard M. Graham
Agent

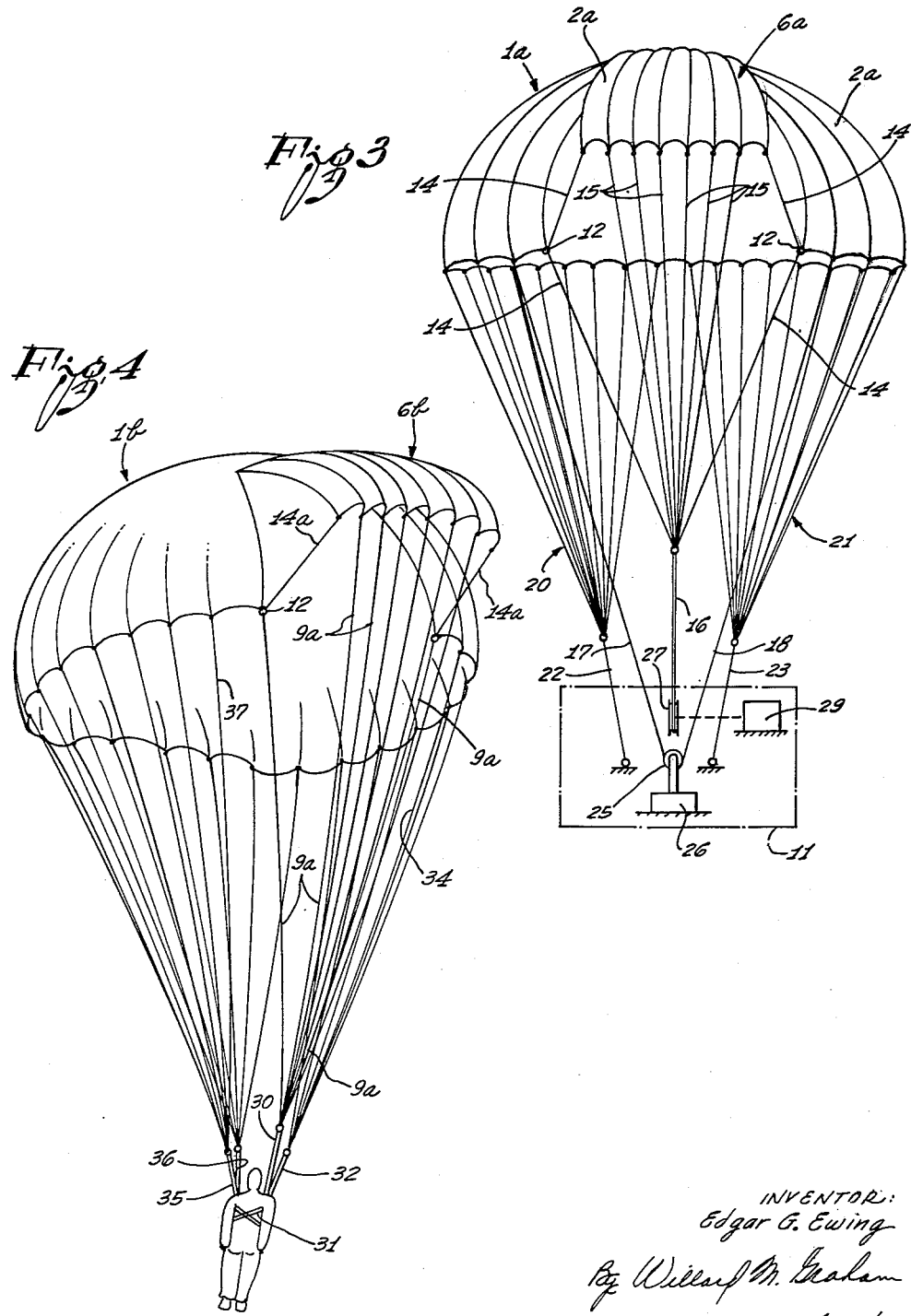

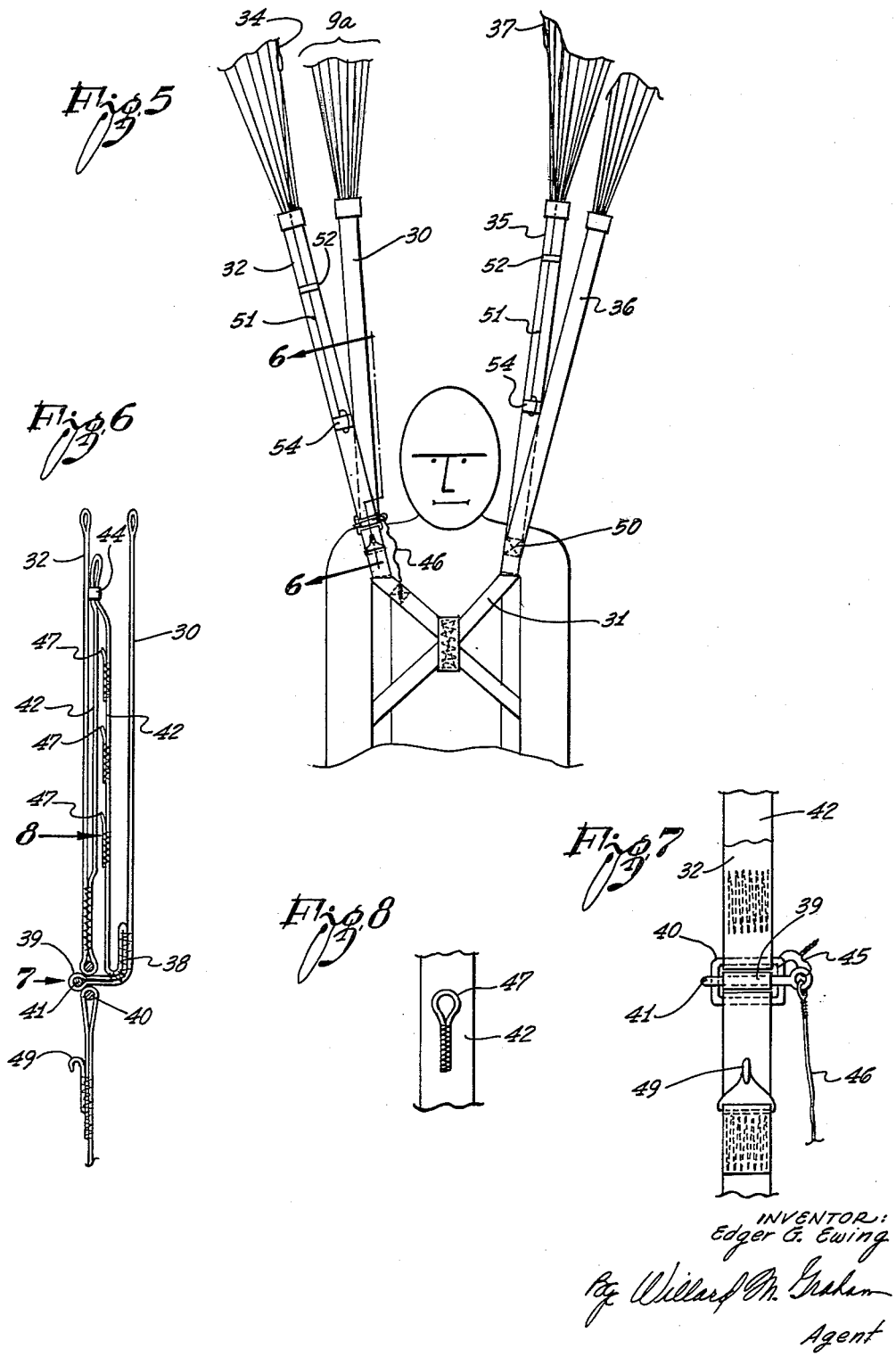

United States Patent Office 3,117,753
Patented Jan. 14, 1964

3,117,753
GLIDING PARACHUTE
Edgar G. Ewing, Woodland Hills, Calif., assignor to Northrop Corporation, Beverly Hills, Calif., a corporation of California
Filed June 16, 1961, Ser. No. 117,567
12 Claims. (Cl. 244—145)

The present invention relates to parachutes, and more particularly, to a dirigible type parachute having steering means and improved gliding means, both the gliding and steering being adjustable during descent.

Previous attempts at obtaining a gliding parachute, i.e., one providing a horizontal component of velocity relative to the horizontal wind, have produced several designs, such as the slotted canopy, T-slot and U-slot canopy, and Derry slot, for example. These existing constructions allow for steering during descent, but are not adaptable to variation of glide angle.

Therefore, it is an object of my invention to provide an adjustable glide parachute.

Further, the conventional gliding parachutes have the undesirable characteristic wherein the greater the glide angle is made, the more unstable in gliding and more unreliable in opening they become. Thus, a compromise must be made between safety and degree of glide angle, and such parachutes require expert, experienced jumpers to handle them properly and safely.

Accordingly, another object of this invention is to provide an improved gliding parachute which is entirely reliable in opening characteristics, and can be adjusted to provide stable slow descent prior to landing thus rendering it useful to average jumpers.

It is a further object of the present invention to provide an improved gliding parachute having unique manual control means therefor.

Another important use of parachutes today is in the recovery and landing of cargo, space capsules, drone aircraft and the like, and other loads not requiring human control in the usual sense associated with personnel parachutes.

Accordingly, a still further object of this invention is to provide an improved gliding parachute having means for remote control thereof both in steering and degree of glide.

Other objects and advantages of the invention will become apparent upon reading the detailed description of the preferred embodiments to follow, with reference to the accompanying drawings, and it is to be understood that other embodiments may be designed which are still comprehended in the basic concept of this invention although they may be modified in form.

Briefly, my invention comprises a control surface in a parachute canopy, formed by two spaced radial slots extending from the canopy skirt toward the apex, this surface being several gores wide. The surface is controllable by separate suspension lines attached at its outer edge, which lines may be attached to means providing controlled extension thereof relative to the fixed suspension lines, so as to allow the control surface to open upwardly and form an airfoil surface above the resulting gap in the normal profile of the canopy.

This new parachute is preferably packed with the control surface suspension lines initially fixed to hold the control surface closed in conformity with the shape of the normal canopy when the parachute is first opened. Means are provided to allow the control surface suspension lines to be extended or payed out after the parachute has fully opened. Steering, that is, turning the parachute to control its direction of glide, may be accomplished either by warping the control surface or by retracting one of the fixed suspension lines located adjacent to the control surface on each side thereof. Means are provided for both manual and remote controlled retraction or extension of the steering lines and glide control lines to the control surface. In one embodiment, the two outer side suspension lines of the control surface pass through slip rings attached at the canopy corners next to the control surface slots, and take the place of the two fixed suspension lines normally tied to the corner of the fixed canopy portion.

In the accompanying drawings,

FIGURE 1 is a perspective view of an inflated parachute canopy, showing my new gliding control surface in its closed position.

FIGURE 2 is a perspective view similar to FIGURE 1, showing the control surface open in operating position.

FIGURE 3 is a rear elevation view of an inflated gliding parachute, control surface open, showing the structure and operation of a servo control means attached to the load.

FIGURE 4 is a substantially rearward perspective view of a manually controlled gliding parachute, showing the rigging of gliding and steering controls.

FIGURE 5 is a front elevation view of the parachute harness, showing the various lines in position on a jumper.

FIGURE 6 is an elevation view, partly sectional, of the right-hand side suspension line risers, viewed as indicated by broken line 6—6 in FIGURE 5, showing details of the glide control lines adjustment means.

FIGURE 7 is a partial front elevation view of the right-hand risers, viewed as indicated by the arrow 7 in FIGURE 6, showing further details of the glide control means.

FIGURE 8 is a detail view of a glide line adjustment loop, viewed as indicated by the arrow 8 in FIGURE 6.

Referring first to FIGURE 1 for a detailed description of certain preferred embodiments of my invention, there is shown a parachute having a canopy 1. Along an edge of two adjacent gores 2, the canopy is in effect slit to provide a first radial slot 4. Spaced five gores from first slot 4 is a second radial slot 5. Both slots extend from the skirt to respective points about one-half to two-thirds of the distance to the peak. The canopy portion between the slots 4 and 5 forms a glide control surface 6, shown closed in FIGURE 1. A plurality of fixed suspension lines 7 connect to the regular canopy skirt, and a plurality of glide control suspension lines 9 connect to the skirt of the control surface 6. In this instance, there are two suspension lines located substantially side by side at each slot.

When the glide control lines 9 are allowed to lengthen, the control surface 6 will open upwardly to a position shown in FIGURE 2, for example. Now the parachute will glide in the direction across from the control surface 6, and, due to air pressure, the lower forward edge of the canopy has a characteristic folded-in portion 10. I have found that this construction of glide surface is superior in several ways to conventional glide means, such as single slotted canopies, T-slotted canopies and others. Examples of actual performance will be pointed out later.

To steer the parachute of FIGURES 1 and 2, the control surface 6 may be warped by lengthening or shortening the control lines on one side thereof relative to the other side. It will be understood that this causes the parachute to rotate to a different heading of glide, where, when the control lines 9 are again equalized in length, the parachute will glide in a straight line in the new direction. This is only one method of steering, as will be shown later.

In FIGURE 3 is illustrated a similar parachute, having a load 11 with remote control means attached thereto. The control surface 6a here is composed of seven gores 2a rather than the five-gore control surface 6 previously described. A slip ring 12 is secured to each corner of the so-called fixed canopy 1a adjacent to the control surface 6a. Through each slip ring 12 is passed the outer glide control line 14 connected respectively to opposite sides of the control surface 6a. The lower ends of these outer lines 14, as well as the intermediate control lines 15, are fixed to a single control line riser 16.

Use of the slip rings 12 holds the fixed canopy corners out to full skirt circumference, since in the embodiment of FIGURES 1 and 2, the corners tend to pull in toward the vertical axis.

Steering of the parachute in FIGURE 3 is accomplished by the more conventional way of pulling in on one or the other of two steering lines 17 and 18 respectively connected to the skirt at the first gore beyond the corner. The remaining fixed suspension lines are divided into a left-hand group 20 and a right-hand group 21 and secured to two fixed risers 22 and 23.

The load 11 may be a cargo, space capsule to be landed, or any other body desired to be guided to a spot landing by remote control means. The two fixed risers 22 and 23 are connected directly to the load 11. The steering lines 17 and 18 are each wrapped around a drive capstan 25 of a steering control servo motor 26 on the load 11 and adapted to be operated by remote radio control, for example. Instead of a single capstan 25 as illustrated diagrammatically in FIGURE 3, each steering line 17 and 18 may be provided with a separate actuating means in actual practice.

As mentioned previously, it will be understood that the parachute of FIGURE 3 may be steered by warping the control surface 6a rather than by use of the steering lines 17 and 18. In this event, the control lines 14 and 15 would obviously be connected to a differential means at their lower ends instead of all to one control riser 16. Either type of steering device is comprehended in the present invention.

The glide control riser 16 is operatively connected to a reel 27 of a glide control servo motor 29 on the load 11 and adapted to be operated by remote radio control, for example.

FIGURE 4 shows the present invention adapted for manual use. The two outside control lines 14a of the glide control surface 6b are again pressed through slip rings 12 on the main portion of the canopy 1b. All eight glide control lines 9a are fastened to a control riser 30 located at the right-hand rear of the parachute harness 31. Since this particular parachute has 28 suspension lines, six lines at the right of the control surface 6b are fastened to a right-hand front fixed riser 32 (including a right-hand steering line 34), thus putting 14 lines, or half the total, on the user's right side. The remaining 14 fixed lines are fastened to two fixed risers 35 and 36 located at the left shoulder, the left rear riser 35 including a left-hand steering line 37. This arrangement makes the parachutist glide in a direction to the left of the way he is facing, but is deemed preferable to placing the control surface 6b exactly at the rear, which would divide the glide control lines 9a into two portions mixed with fixed lines at two different risers. With very little effort, the jumper will adapt himself to gliding slightly to his left. Pulling down on the right-hand steering line 34 causes rotation of the parachute to the right, and pulling down on the left-hand steering line 37 turns it to the left.

In FIGURES 5 and 6, the control riser 30 is shown as packed, i.e., with the control surface 6b closed. Two thicknesses of the control riser 30 are joined as at 38 to form a loop 39 which is pushed through a special buckle 40 on the right front fixed riser 32 and locked in position by a removable pin 41. In this retracted position, a doubled up portion 42 of the control riser 30 is stowed behind the fixed riser 32 and held in temporary place by an elastic loop 44, for example, fastened to riser 32. After the parachute has opened, the operator will pull down on the control riser 30 to develop a little slack, and then remove the pin 41 after first twisting it to break the safety tie 45 (FIGURE 7). He may now pay out the control riser 30 to allow the glide control surface 6b to open sufficiently for the desired glide angle. A short retaining leash 46 tied between the pin 41 and the parachute harness 31 may be provided to permit re-use of the pin.

On the control riser 30 are secured a number of adjustment eyes 47 (FIGURE 8) which may be attached over a hook 49 on the shoulder harness, to select intermediate glide angles during descent. A conventional canopy release 50 is preferably provided at one shoulder for releasing all suspension lines on one side after the jumper has landed.

Each of the steering lines 34 and 37, as shown in FIGURE 5, is provided with a separate extension 51 which passes through a guide 52 on the respective fixed riser 32 and 35 and is tied to a fastening means 54 within reach of the jumper. It is thus seen how the steering lines 34 and 37 can be manually operated.

This invention can be incorporated in any type of canopy and enables the operator to adjustably direct his motion along a variable glide path in any direction. It will be seen that uniform extension of the control surface not only enlarges the opening in the side of the canopy, but also changes the flying shape of the parachute. This new shape is, in effect, that of a highly cambered single-surface airfoil having a higher ratio of lift to drag than the unmodified canopy. The resultant change in air flow through and around the parachute causes the system to glide with a horizontal velocity component that is proportional to the amount of surface extension. A control surface area of 25% of the entire canopy and a glide angle in the neighborhood of 45 degrees to the relative wind are entirely feasible.

Either described method of steering may be used. Warping the control surface by unequal extension of the glide control lines is seen to induce a turning moment to the right or left similar to the action of an airplane rudder.

For maximum safety and reliability of opening, the control surface can be initially rigged closed, and it will also be apparent that the gliding motion can be started and stopped or varied at will. A parachute embodying this invention has several advantages over other types of controllable parachutes which are merely steerable, and these advantages include greater maneuverability, greater angle of glide from the vertical, higher reliability of opening, greater uniformity of loading throughout the opening cycle, greater safety of landing through reduction of horizontal velocity to a minimum during final approach, and greater safety for primary training when used with limit stops on control surface extension. A limit stop may obviously consist of a shorter than normal control riser 30 or a suitable means for preventing full extension of the control riser during use, for example.

As an example of the kind of performance obtainable with this invention, a 40-foot diameter, 30-gore Ringsail type parachute having a 5-gore glide control surface rigged as shown in FIGURES 1 and 2, and with the control surface suspension lines extended nine feet, has a glide angle of approximately 30 degrees from the vertical with respect to the relative wind. The control surface slots are two-thirds of the canopy radius. Since this control surface has an area only about 13% of the total canopy area, and the parachute is extremely stable, it is seen that a 25% control surface area can safely produce a glide angle substantially greater than 30 degrees.

Thus it is seen that a novel, improved, simple, and adjustable glide parachute has been provided by the present invention. An important feature is that provisions are made for retracting or closing the control surface after it has been opened, thereby obtaining reversible control of the glide angle. This parachute is obviously useful for sport jumpers, spot landing of foresters and fire fighters and the like, and the landing of manned capsules and space vehicles, for example, that must be able to glide toward a preselected landing site and avoid obstacles enroute. In addition, a cluster of parachutes may have the present glide control surface incorporated in the rearmost parachutes of the cluster, or the parachutes may be arranged in a line abreast.

While in order to comply with the statute, the invention has been described in language more or less specific as to structural features, it is to be understood that the invention is not limited to the specific features shown, but that the method and means herein disclosed comprise a preferred form of several modes of putting the invention into effect, and the invention is therefore claimed in any of its forms or modifications within the legitimate and valid scope of the appended claims.

I claim:

1. A dirigible parachute comprising a canopy, said canopy having a pair of radial separations cutting the skirt of said canopy and extending from the canopy skirt toward the apex a predetermined distance to form a glide control surface of an outer portion of a sector of said canopy, said glide control surface being at least two gores wide.

2. Apparatus in accordance with claim 1 wherein said separations extend more than one-fourth of the way to said apex.

3. Apparatus in accordance with claim 1 wherein said separations extend more than one-fourth and less than all the way to said apex.

4. Apparatus in accordance with claim 1 wherein said separations extend substantially one-half to two-thirds of the way to said apex.

5. Apparatus in accordance with claim 1 wherein adjustable suspension lines are fixed to the skirt of said control surface.

6. Apparatus in accordance with claim 5 including means for extending and retracting said suspension lines during descent of said parachute.

7. A dirigible parachute comprising a canopy, a glide control formed in one portion of said canopy by a pair of radial separations cutting the skirt of said canopy and extending from the canopy skirt toward the apex, adjustable glide suspension lines fixed to the skirt of said control surface, means defining a guide aperture in each corner of the remaining portion of said canopy skirt adjacent said control surface, the two end glide suspension lines of said control surface slidably passing through said apertures, respectively.

8. Apparatus in accordance with claim 7 including a pair of steering suspension lines respectively connected to said canopy skirt, one just beyond each of said two end glide lines on the outer side thereof from said control surface.

9. Apparatus in accordance with claim 8 including means at the lower ends of said glide lines for variable and reversible extension thereof, means at the lower ends of said steering lines for variable and reversible retraction thereof, respectively.

10. In a dirigible parachute, a fixed canopy portion having a skirt, an adjustable canopy portion forming a glide control surface having a skirt, the skirt of said control surface being separated from the skirt of said fixed canopy portion, said control surface filling in the normal shape of said parachute when said control surface is closed, and said control surface being connected to said fixed canopy portion only along an upper edge of said control surface, a plurality of fixed suspension lines connected to the skirt of said fixed canopy portion, fixed risers attached to the lower ends of groups of said fixed lines, a plurality of control suspension lines connected to the skirt of siad control surface, a control riser, means connecting the lower ends of said control lines to said control riser, and means connected to the lower end of said control riser for variable and reversible extension thereof to allow said control surface to open a predetermined amount above the normal profile of said parachute during operation thereof.

11. Apparatus in accordance with claim 10 including a load attached to said fixed risers, and wherein said extension means comprises a servo motor mounted on said load.

12. Apparatus in accordance with claim 10 wherein said control riser is substantially longer than said fixed risers, including a parachute harness connected to the lower ends of said risers, wherein said extension means comprises a folded portion of said control riser and releasable storage means holding said folded portion to one of said fixed risers, and intermediate-length connecting means between said harness and said control riser to provide a number of adjustment positions of said glide control surface.

References Cited in the file of this patent

UNITED STATES PATENTS

| 1,194,691 | Adams | Aug. 15, 1916 |
| 1,685,422 | Hurlburt | Sept. 25, 1928 |
| 2,384,416 | Derry | Sept. 4, 1945 |
| 2,392,946 | Quilter | Jan. 15, 1946 |
| 2,458,264 | Hart | Jan. 4, 1949 |
| 2,469,573 | Quilter | May 10, 1949 |
| 2,919,085 | Horning | Dec. 29, 1959 |
| 3,013,753 | Hughes et al. | Dec. 19, 1961 |

FOREIGN PATENTS

| 144,792 | Great Britain | June 17, 1920 |
| 226,851 | Great Britain | Dec. 30, 1924 |